(12) United States Patent
DeSalvo

(10) Patent No.: US 6,961,420 B2
(45) Date of Patent: Nov. 1, 2005

(54) APPARATUS AND METHOD FOR RECORDING INCOMING CALL INFORMATION

(75) Inventor: Christopher Joseph DeSalvo, San Francisco, CA (US)

(73) Assignee: Danger, Inc., Palo Alto, CA (US)

( * ) Notice: Subject to any disclaimer, the term of this patent is extended or adjusted under 35 U.S.C. 154(b) by 0 days.

(21) Appl. No.: 09/991,246

(22) Filed: Nov. 13, 2001

(65) Prior Publication Data

US 2003/0091173 A1 May 15, 2003

(51) Int. Cl.[7] .................... H04M 1/00; H04M 1/56; H04M 3/42
(52) U.S. Cl. ............. 379/355.02; 455/415; 379/142.01
(58) Field of Search .................. 379/142.01, 93.17, 379/93.23, 355, 355.01, 355.06, 142.03, 379/142.06, 142.1, 142.11, 142.17, 142.14, 379/354, 355.02, 355.05, 373.01, 142.04; 455/415, 556, 557, 564, 566, 414.1, 418, 455/419, 565

(56) References Cited

U.S. PATENT DOCUMENTS

| | | | | | |
|---|---|---|---|---|---|
| 4,924,496 | A | * | 5/1990 | Figa et al. | 379/142.01 |
| 5,446,785 | A | * | 8/1995 | Hirai | 379/142.01 |
| 5,604,492 | A | * | 2/1997 | Abdul-Halim | 379/142.01 |
| 5,734,706 | A | * | 3/1998 | Windsor et al. | 379/142 |
| 5,894,507 | A | * | 4/1999 | Hatamura | 379/93.23 |
| 5,903,632 | A | * | 5/1999 | Brandon | 379/93.23 |
| 5,923,327 | A | * | 7/1999 | Smith et al. | 345/341 |
| 6,266,403 | B1 | * | 7/2001 | Ananikian et al. | 379/142.01 |
| 6,266,539 | B1 | * | 7/2001 | Pardo | 455/556 |
| 6,298,128 | B1 | * | 10/2001 | Ramey et al. | 379/142.01 |
| 6,321,078 | B1 | * | 11/2001 | Menelli et al. | 455/407 |
| 6,397,060 | B1 | * | 5/2002 | Oikawa | 455/420 |
| 6,442,251 | B1 | * | 8/2002 | Maes et al. | 379/93.23 |
| 6,449,360 | B1 | * | 9/2002 | Utsumi | 379/381 |
| 6,473,496 | B1 | * | 10/2002 | Mohageg | 379/90.01 |
| 2002/0052195 | A1 | * | 5/2002 | Lee | 455/414 |
| 2002/0126814 | A1 | * | 9/2002 | Awada et al. | 379/142.01 |

* cited by examiner

Primary Examiner—Rexford Barnie
(74) Attorney, Agent, or Firm—Blakely, Sokoloff, Taylor & Zafman LLP

(57) ABSTRACT

A method for interrelating call information between programs of a data processing device. Call information including a caller's name, phone number, the date of the call, start time of the call, finish time of the call, the call duration, and the type of call, may be organized and accessed by several different programs running on a data processing device. Information such as a caller's name and phone number may be accessed by a caller identification device coupled to the data processing device. Information such as the start time and finish time may be accessed by a clock coupled to the data processing device. The call duration may be calculated from the start and finish times or may be accessed from a timer coupled to the data processing device.

9 Claims, 6 Drawing Sheets

US 6,961,420 B2

APPARATUS AND METHOD FOR RECORDING INCOMING CALL INFORMATION

FIELD OF THE INVENTION

The present invention relates to computers. In particular, the present invention relates to a method of organizing data in one or more user applications.

BACKGROUND OF THE RELATED ART

Data processing devices, such as Personal Digital Assistants ("PDAs") and programmable wireless phones, may store information in a variety of ways using a variety of different applications. For example, cellular phones may automatically store call information for incoming, outgoing, and missed calls. The caller names and numbers associated with incoming and missed calls may be recorded using automatic number identification ("ANI") technology. Similarly, PDAs may store detailed contact information such as contact names, addresses, and phone numbers using personal information management applications. These include simple address book applications as well as personal information management application suites comprised of calendar applications, contact applications, email applications, and to-do list applications, to name a few.

Once the information is stored on the data processing device, it may be utilized in a number of ways. For example, with respect to cell phones, once a caller's number is identified and stored via ANI technology, the user may manually select the number and/or caller name to return the call. However, even though this call information is temporarily accessible from the cell phone, no mechanisms currently exist for automatically importing the call information into the user's address book application or other personal information management application.

SUMMARY OF THE INVENTION

A method to receive and organize call information into an address book program, calendar program, and phone log program on a data processing device.

BRIEF DESCRIPTION OF THE DRAWINGS

The present invention is illustrated by way of example and not limitation in the accompanying figures.

DETAILED DESCRIPTION

The following description makes reference to numerous specific details in order to provide a thorough understanding of the present invention. However, it is to be noted that not every specific detail need be employed to practice the present invention. Additionally, well-known details, such as particular materials or methods, have not been described in order to avoid obscuring the present invention.

Figure 1:
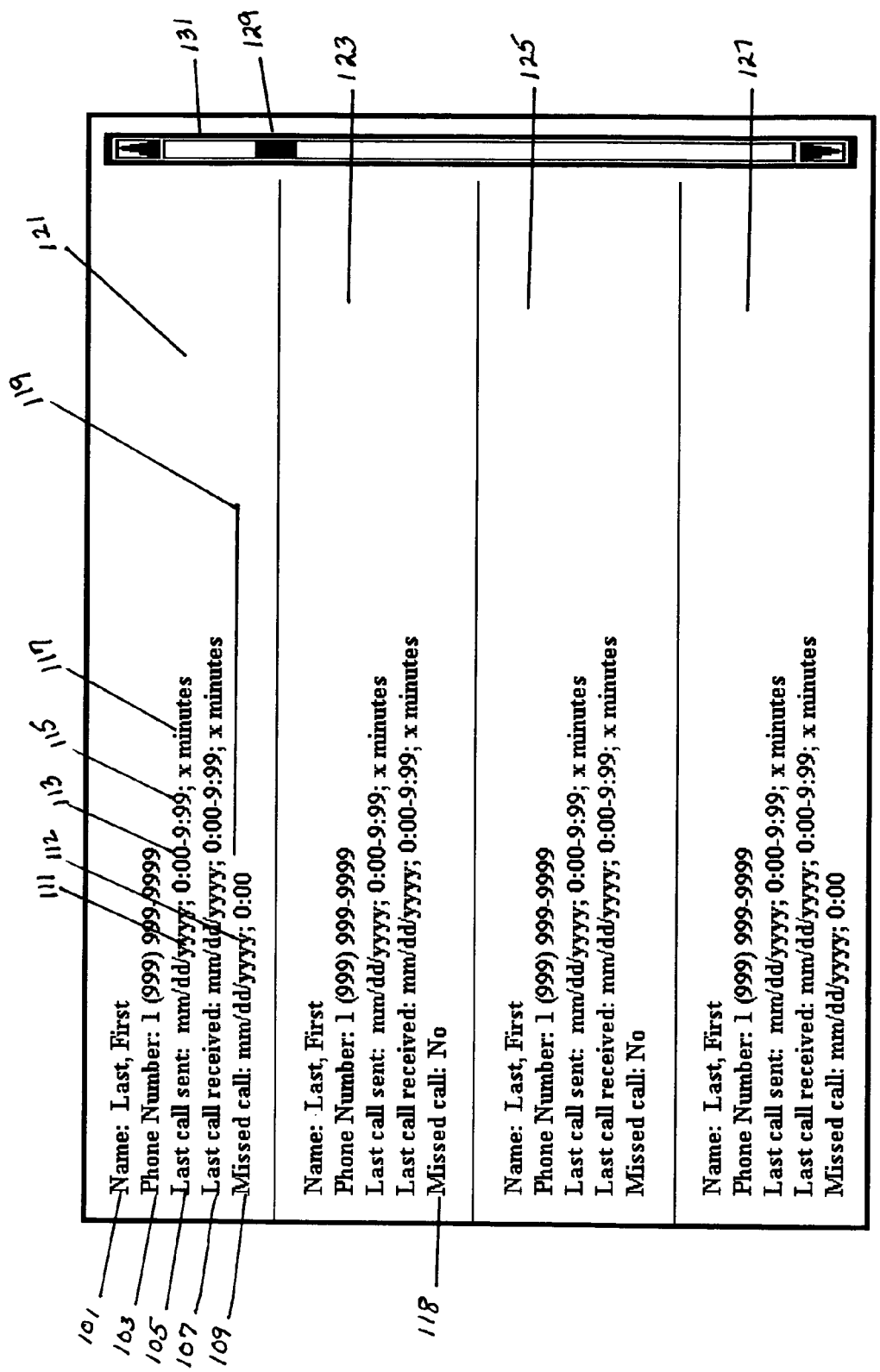
FIG. 1 shows an embodiment of the invention with an address book program for organizing call information.

Referring to FIG. 1, an embodiment of the invention is shown in form of an address book program for receiving and organizing call information. The address book program may receive relevant information for the call from different sources including, but not limited to, caller identification technology (e.g., ANI), a clock, a calendar program, a timer, and a network over which the data processing device communicates. As illustrated, various types of call information may be collected and organized including, but not limited to, the caller's name 101 and phone number 103, the call date 111, the call start time 113 and finish time 115, the call duration 117. The call type may also be stored including whether the call was sent or received, and whether (if received) the call was missed. In addition, an indication as to whether the call was personal or business may be determined.

In the illustrated embodiment of the address book program, shown on a data processing device screen 129, address book entries 121, 123, 125, and 127 may be displayed vertically along with the other relevant call information. A user may move through call information in the address book program using a scroll bar 131. Other methods of moving through the address book program may also be within the scope of the invention. In addition, other address book programs or other formats for organizing call information are also within the scope of the invention.

In the embodiment of the invention shown in FIG. 1, each address book program entry, such as the entry 121, may display the caller's name 101, the caller's phone number 103, the call information for a last call sent entry 105, the call information for a last call received entry 107, and the call information for a last call missed entry 109.

The call information for the last call sent entry 105, such as, but not limited to, the date 111, the start time 113, the finish time 115, and the call duration 117, may be organized horizontally next to the last call sent entry 105. In addition, similar call information may be organized with the last call received entry 107. Because there may not be a start time, finish time, and call duration for a missed call, the call information relevant to the missed call may include a date 112 and a time 119 the call was received. Other call information for the missed call may also be organized into the address book program.

In one embodiment, the data processing device automatically collects call information associated with the call (e.g., using ANI or other call identification technologies) and attempts to associate this information with one or more address book program entries (e.g., by comparing the caller name or number with names/numbers stored in the address book). In one embodiment, if the address book program does not contain contact information related to the caller, it may set up a new entry with the call-related information automatically retrieved from the call (e.g., the caller's name and number). The user may subsequently update the entry with additional information as required.

As illustrated in FIG. 1, in one embodiment, the data processing device initially determines the date 111 and the start time 113 for each incoming call and organizes this information into the address book program entry associated with the incoming caller's name 101. When the call is finished, the data processing device may also determine the finish time 115 and the call duration 117 and organize this information in the address book program. The organization of call data into the address book program may occur after the call is finished and/or as the call information is determined. Moreover, if the user of the data processing device receives or sends another call to a person with that caller's name 101, the relevant call information next to the last call sent entry 105 or the last call received entry 107 may be updated with the call information of the current call sent or received.

In the same way, call information for a missed call entry 109 may be determined and organized into a relevant address book program entry. For example, when an incoming call is not answered, the data processing device may determine the current date and time the call came in and organize the call information into a relevant address book program entry. The call may or may not be redirected to a voicemail message. If a voicemail message is left by the caller, a voicemail indication may also be associated with the address book entry.

As mentioned above, the data processing device may determine which entry to associate the call with by comparing the call-related information (e.g., the name and/or phone number) to relevant address book program entries (e.g., the name entry 101 and/or the phone number entry 103). If the call information from the caller identification device relates to a name that is in the address book program, but the phone number associated with the name and the caller identification device is not the same as the phone number associated with the name in the address book program, the data processing device may update and/or supplement the phone number in the address book program with the phone number from the caller identification device. Updating the phone numbers in the address book program in this manner makes it more likely that the caller will successfully reach the caller upon selecting the address book entry to initiate a return call.

Incoming call-related information may not exist for one or more entries in the address book. For example, in the address book program shown in FIG. 1, the missed call information 118 in the address book program entry 123 may indicate the word "No" next to missed call 118 to indicate that, for this address book program entry, there has been no missed call. In addition, certain information may be missing (i.e., unavailable) in the data processing device. The data processing device may indicate missing information with a missing call information identifier such as "X's", or "-'s." Different missing call information identifiers are also within the scope of the invention.

Figure 2:
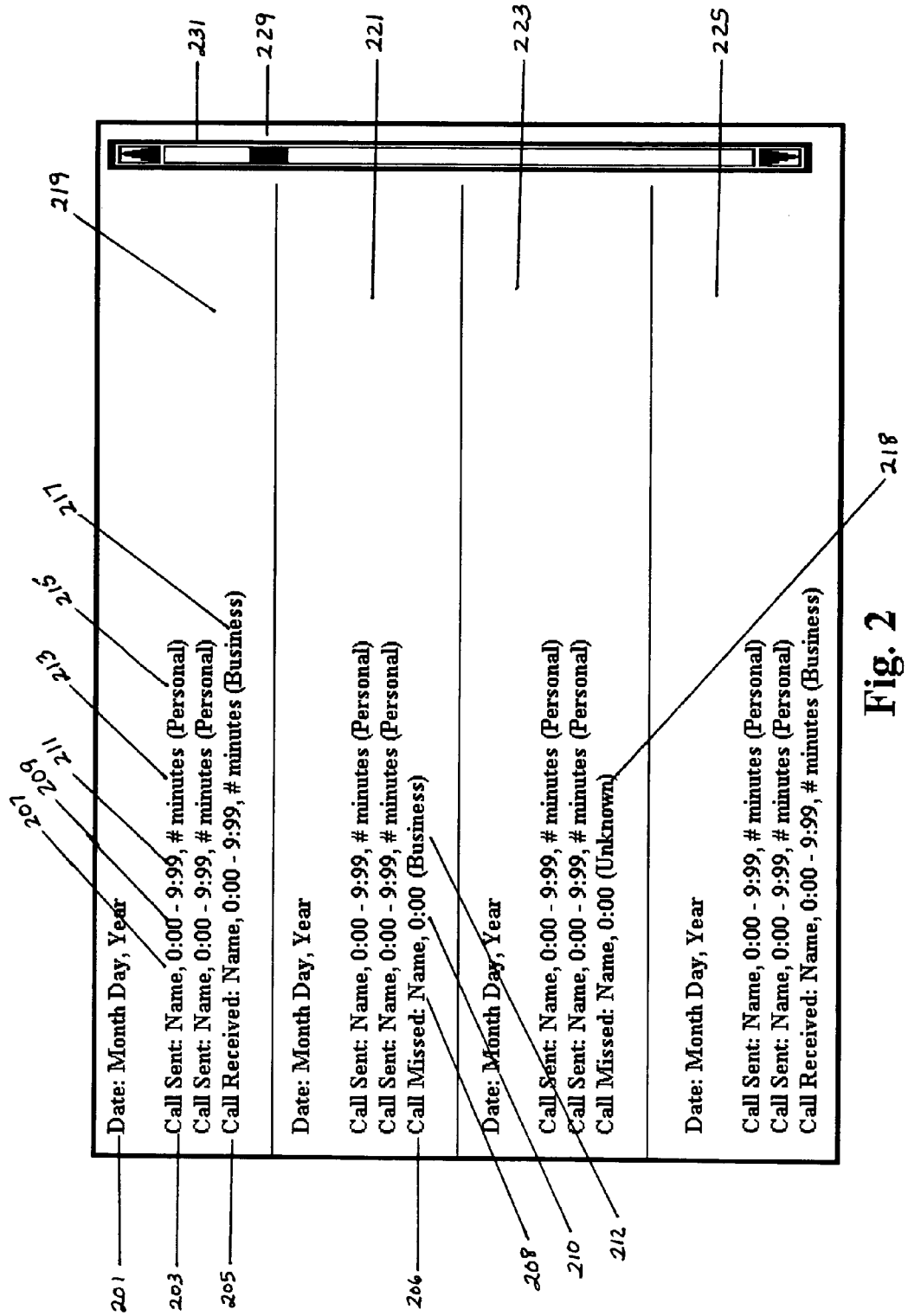
FIG. 2 shows embodiment of the invention with a calendar program for organizing call information.

Referring to FIG. 2, an embodiment of the invention is shown in the form of a calendar program displayed on a data processing device screen 229. Various types of call information may be determined and organized by the data processing device within the calendar program. The calendar program shown on the data processing device screen 229 may display information relevant to each date vertically. However, other formats for displaying information with the date for the calendar program are contemplated to be within the scope of the invention. In the embodiment of the invention shown in FIG. 2, a date 201 is shown for each entry with relevant call information (e.g., a call sent entry 203 and/or call received entry 205). The relevant call information for a sent call 203, such as, but not limited to, a caller's name 207, start time 209, finish time 211, call duration 213, and call type 215, may be shown in association with a call sent entry 203. In addition, similar information may be displayed for a call received entry 205.

In one embodiment of the invention, all calls sent, received, and missed for each day in a calendar program are organized corresponding to a relevant date 201 and calendar program entry 219, 221, 223, and 225. Other formats of displaying relevant call information for each calendar program entry may also be included within the scope of the invention. In addition, a scroll bar 231 may be used to scroll through calendar program entries. The calendar entry program on the data processing device may be able to access call information, such as the caller's name 207, from a caller identification device coupled to the data processing device. In one embodiment, the calendar program may access an address book program to associate a phone number of a call with a number/name within the address book. The calendar program may then display relevant address book data for the user. The call duration 213 may be calculated using the start time 209 and finish time 211 or using a timer coupled to the data processing device, or by other methods of determining the call duration. In addition, the call type, such as, but not limited to, personal 215 or business 217 may be determined by accessing information from the address book program. Other call information related to a call sent entry or a call received entry may be organized into the calendar program.

In addition, the call information related to missed call entries 206 may be organized into the calendar program. For example, the caller's name 208 may be determined using caller identification techniques and organized with the call missed entry 206 in the calendar program along with the start time 210 for the call. If the name of the caller is not organized in the address book program or if the address book program does not identify the call type for the current caller, the data processing device may use an appropriate identifier 218 (e.g., such as "Unknown") in the call type entry.

In addition, as with the address book program described above, the data processing device may indicate missing call information in the calendar program with a missing call information identifier (e.g., using dashes, "X's", or other missing call information identifier). Other missing call information identifiers may be used within the scope of the invention.

Figure 3:
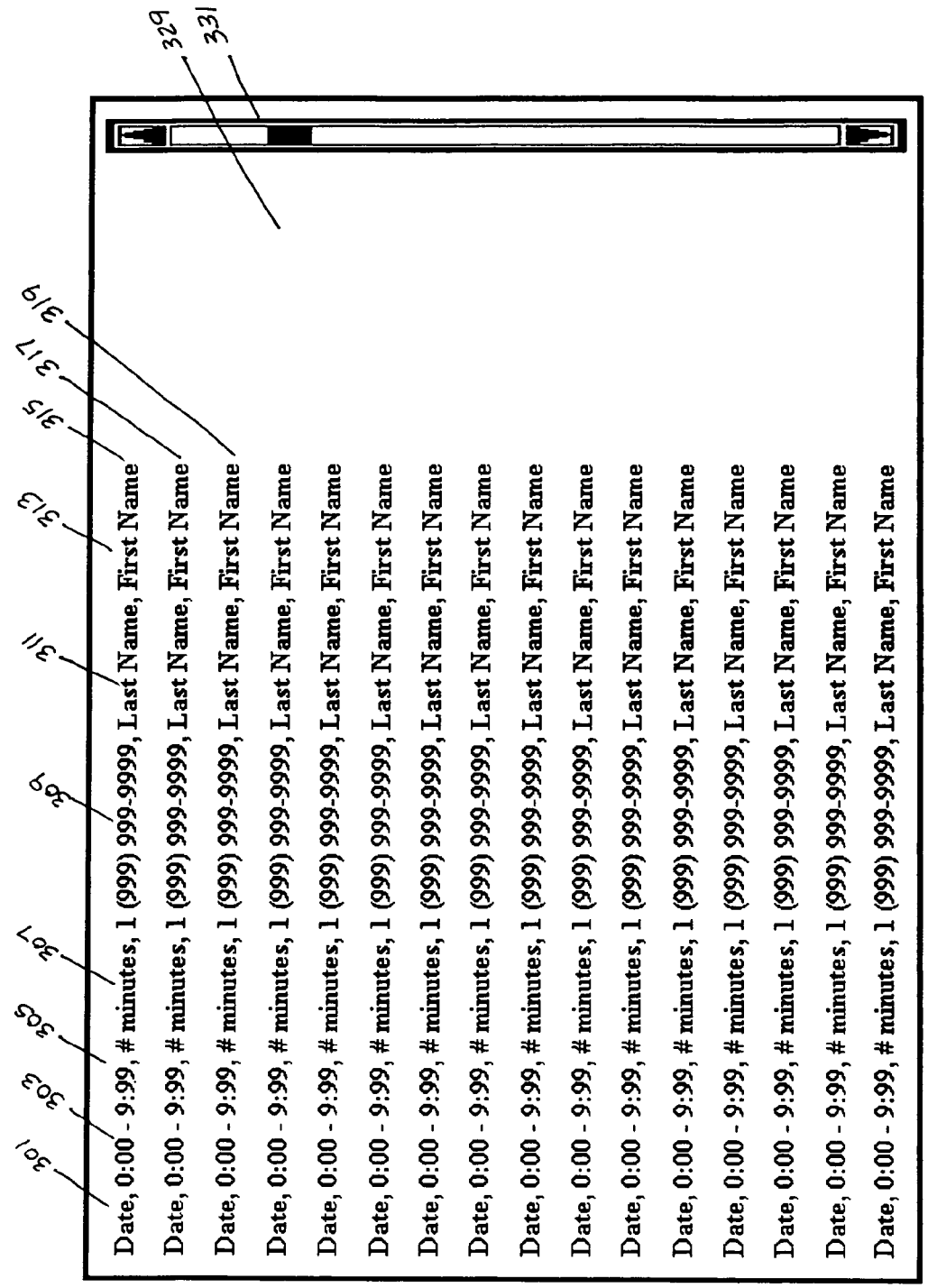
FIG. 3 shows an embodiment of the invention with a phone log program for organizing call information.

Referring to FIG. 3, an embodiment of the invention is shown in the form of a phone log for a data processing device. In addition to the embodiments described above, call information may also be organized in a phone log in a manner such as the list shown on data processing screen 329. Each entry of the phone log, such as entries 315, 317, and 319, may include call information such as, but not limited to, the call date 301, the start time 303, the finish time 305, the call duration 307, the phone number 309, and the first 313 and last name 311 of the caller.

While the entries in the phone log are listed vertically in the embodiment shown in FIG. 3, other formats of displaying the call information may also be within the scope of the invention. In one embodiment, the phone log may retrieve and display other information related to the call from other different programs in the data processing device (e.g., the address book and/or calendar program). For example, the date 301 may be received from a calendar program. The start time 303 and the finish time 305 may be obtained from a clock coupled to the data processing device. In addition, the call duration 307 may be calculated using the start time 303 and the finish time 305, or the call duration 307 may be obtained from a timer coupled to the data processing device. The phone number 309, the last name 311, and the first name 313 may be determined using caller identification techniques (e.g., ANI) coupled to the data processing device. If only the phone number 309 is provided by the caller identification techniques, the last name 311 and first name 313 may be determined by searching the address book program on the data processing device. Other information, such as the call type, including, but not limited to, whether the call was received, missed or sent; personal or business may also be organized in the phone log. Furthermore, in the embodiment of the phone log shown in FIG. 3 a scroll bar 331 may be used to move through call information in the phone log.

Figure 4:
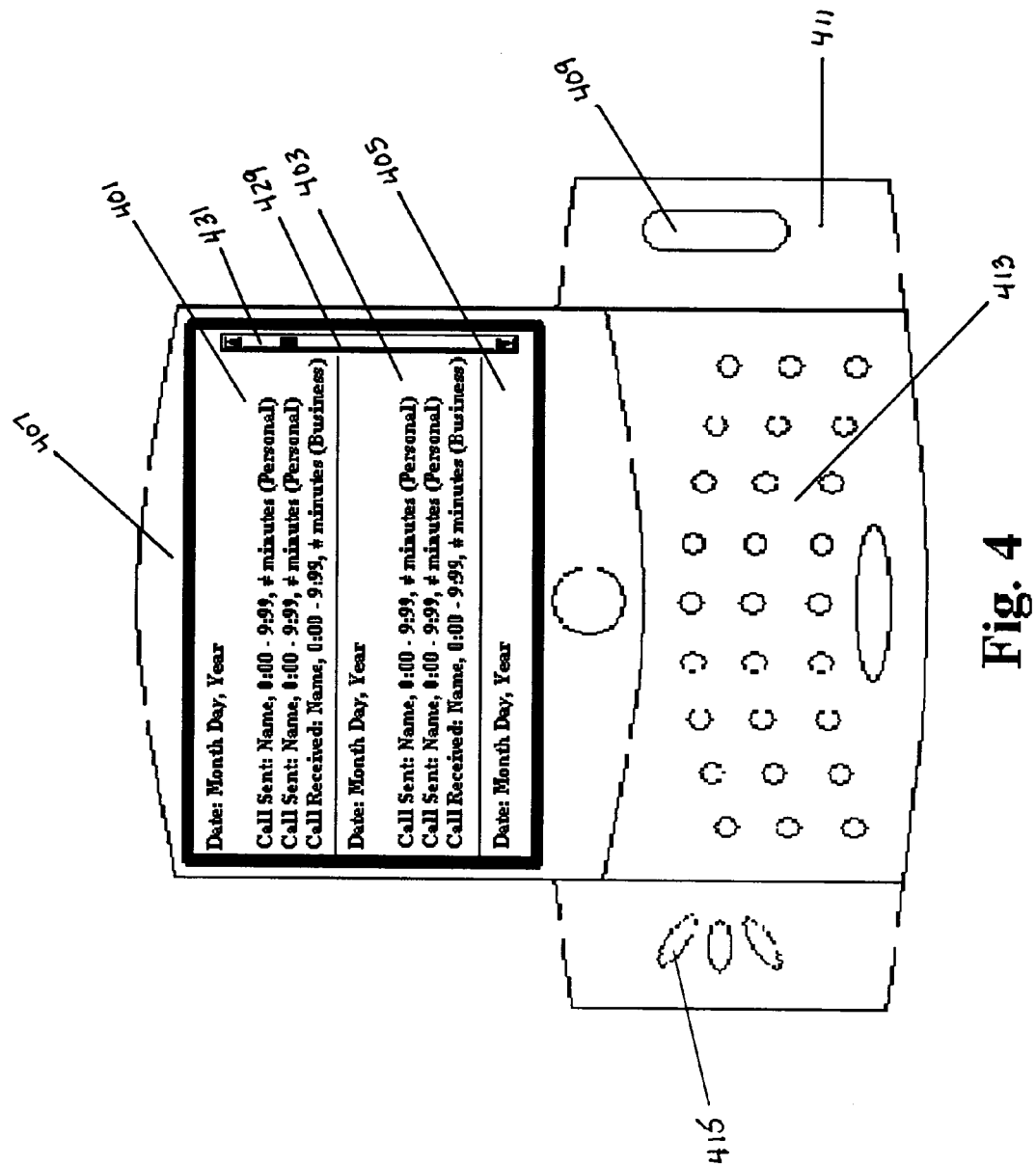
FIG. 4 shows an embodiment of the invention with an address book program for organizing call information shown on an embodiment of a Personal Digital Assistant.

Referring to FIG. 4, an embodiment of the invention is shown in the form of a calendar program on the screen of a Personal Digital Assistant 411 according to one embodiment. The Personal Digital Assistant 411 may have input devices including, but not limited to, a keyboard 413, buttons 415, and scroll device 409. The screen 429, on a screen mount 407, may pivot on the Personal Digital Assistant to open and close as indicated by rotation arrow 420. As seen on the screen 429, calendar program entries 401, 403, and 405 may store relevant call information as described above. Information on the calendar program may be displayed by scrolling with scroll bar 431. Other ways of displaying calendar program entries and moving through the calendar program and other programs are also contemplated within the scope of the invention.

Figure 5:
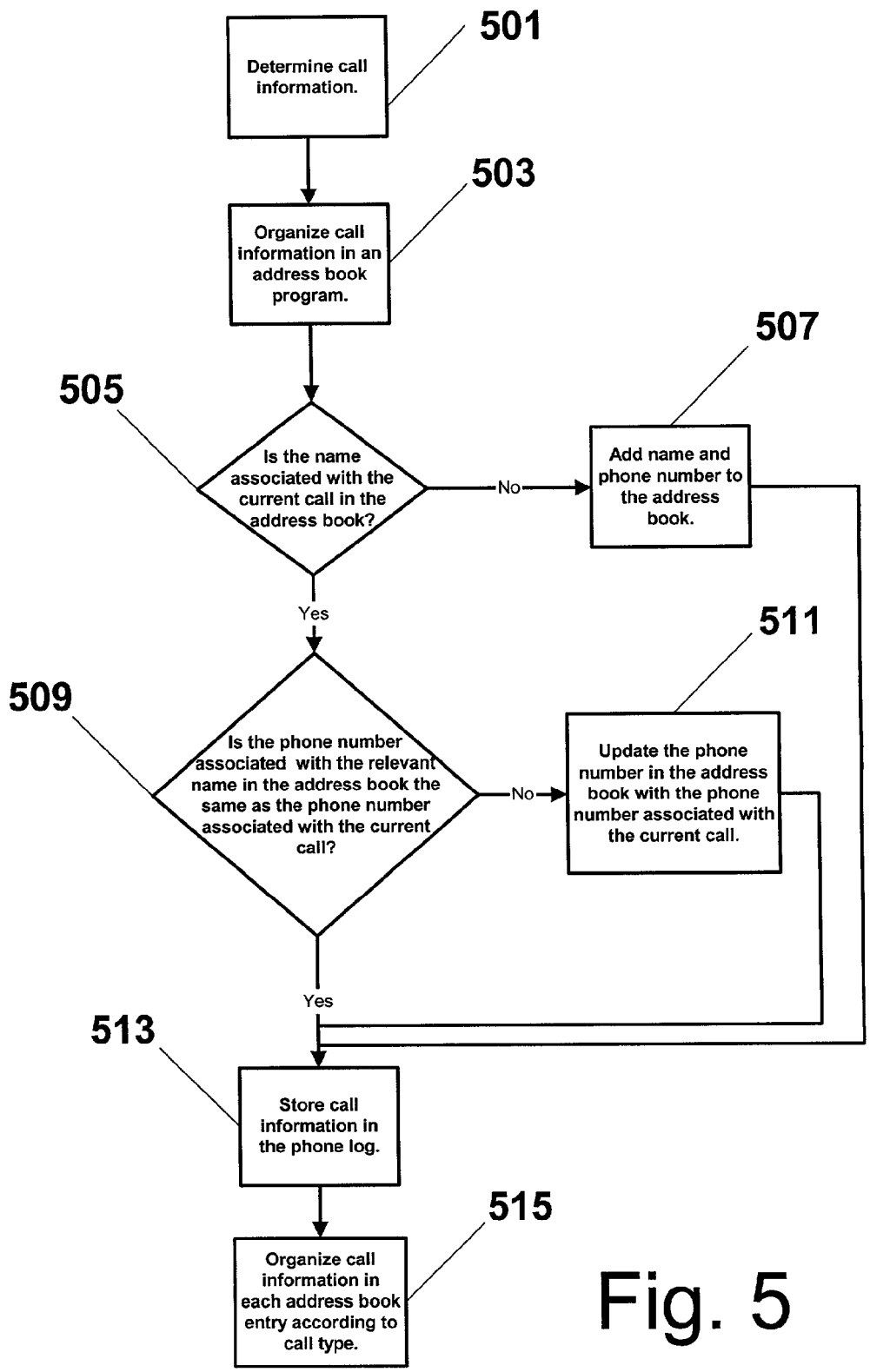
FIG. 5 shows an embodiment of the invention in the form of a flowchart for organizing call information into an address book program.

A method according to one embodiment of the invention is illustrated in FIG. 5. At block 501, the wireless data processing device determines call information by, for example, interacting with one or more programs (e.g., programs which employ ANI technology to extract information from incoming calls). At block 503, the data processing device organizes the collected call information into an address book program. The user may also manually input various types of contact information into the address book program. At block 505, one embodiment of the data processing device determines whether a name associated with a current incoming call is similar to a name in the address book program. For example, if a name associated with the call is in the form of a last name and a first initial, in one embodiment, the device will initially determine whether the last name appears and, if so, if the first initial matches the first letter of the first name in the address book entry. Various other known matching/correlation techniques may be employed to identify a matching entry. If the name associated with the current call does not match with an address book program entry then, at block 507, the name and phone number may be added to the address book program (e.g., in response to the user configuring the wireless device to store all unlisted callers). If a name match is identified in the address book program then, at decision block 509, the wireless device determines whether the phone number associated with the relevant name in the address book program is the same as the phone number associated with the current call. If the phone number is different then, at block 511, the wireless device updates the phone number in the address book program with the phone number associated with the current call. Alternatively, the address book program may simply supplement the address book with the additional number. For example, the number stored in the address book may be the caller's work number and the current call may have been placed from the caller's home or cell phone. As such, in this embodiment, the wireless device may keep the caller's work number (e.g., identified as such in the address book entry) and store the new number as an "unknown" type. The user may subsequently be given the option to classify the unknown number under a certain type heading (e.g., "home," "cell phone" . . . etc) the next time the user accesses the address book.

At block 513, the updated call information is stored in the phone log. At block 515, the wireless device organizes call information in each address book program entry according to call type (e.g., whether the incoming call was received or missed).

Although the process illustrated in FIG. 5 initially searches for a match for the caller's name followed by the caller's number, it should be noted that the search process may start with caller's number (e.g., and search for the name only if the number is not listed in the address book). Moreover, various types of call-related information other than name and number may be used to identify a match in the address book. This may include address information and/or any other type of information transmitted along with the incoming call.

Figure 6:
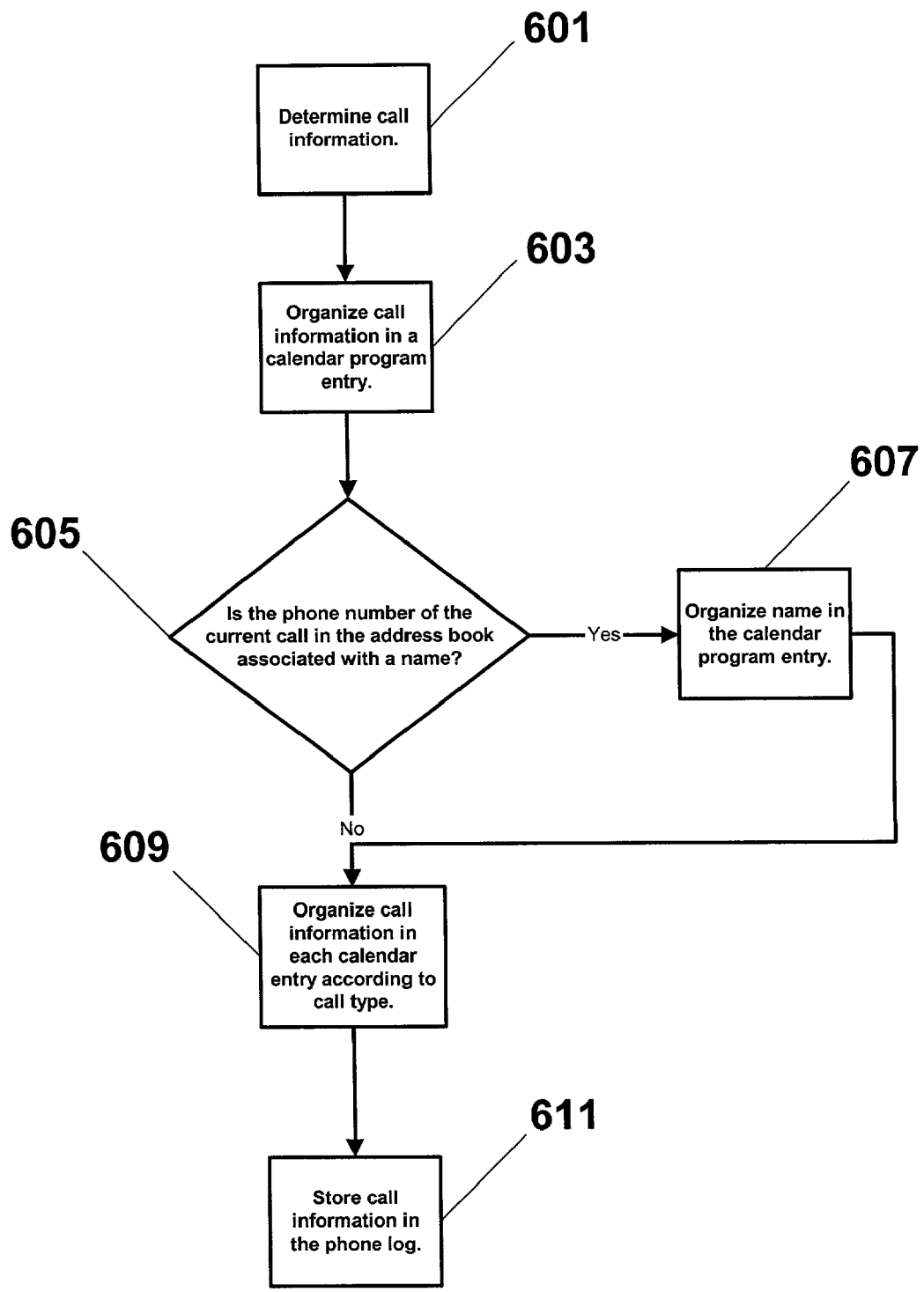
FIG. 6 shows an embodiment of the invention in the form of a flowchart for organizing call information into a calendar program.

An embodiment of the invention which organizes relevant call information in a calendar program is illustrated in FIG. 6. At block 601, the wireless data processing device determines call information and, at block 603, organizes the call information in a calendar program entry. At decision block 605, the device determines whether the phone number of the current call is in the address book program associated with a name. If the phone number of the current call is in the address book program associated with a name, then at block 607, the device organizes the name in a calendar program entry. At block 609, instructions from a machine-readable medium may cause the processor to organize call information in each calendar program entry according to call type. At block 611, the processor stores the call information in the phone log.

Embodiments of the invention may include various steps as set forth above. The steps may be embodied in the machine-readable instructions which cause a general-purpose or special-purpose processor to perform the steps. Alternately, these steps may be performed by specific hardware components that contain hardware logic for performing the steps, or by any combination of programmed computer components and custom hardware components.

Elements of the present invention may also be provided as a machine-readable medium for storing the machine's executable instructions. The machine-readable medium may include but is not limited to floppy diskettes, optical disks, CD ROM's, and magneto-optical disks, ROMs, RAMs, EPROMs, EEPROMs, magnetic or optical cards, propagation media or other type of media/machine-readable medium suitable for organizing electronic instructions. For example, the present invention may be downloaded as a computer program which may be transferred from a remote computer (e.g., a server) to a requesting computer (e.g., a client) by way of data signals embodied in a carrier wave or other propagation media via communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while interrelated applications were described above in a context of a portable wireless device, such a limitation is not required for performing the underlying principles of the invention. Accordingly, the scope and spirit of the invention should be judged in terms of the claims, which follow.

I claim:

1. A machine-readable medium having instructions to cause a machine to perform a method, the method comprising:

maintaining an address book data store on a device, the device capable of receiving and transmitting phone calls, the address book to include one or more pre-existing address book entries of one or more contacts, wherein each address book entry includes a first name field storing a pre-existing first name, a last name field storing a pre-existing last name, and a phone number field storing a pre-existing phone number;

identifying call information transmitted with a call, the call information including a new phone number;

associating the call information with one of the one or more pre-existing address book entries in the address book data store; and updating the pre-existing address book entry with the new phone number upon determining the new phone number does not match the pre-existing phone number.

2. The method as in claim 1, wherein each address book entry includes a pre-existing date of call field and a pre-existing duration of call field, and the method further comprising:

updating said associated pre-existing address book entry with a date of the call and a duration of the call automatically without user intervention.

3. The method as in claim 1 further comprising:

querying a user of the device whether to update the associated pre-existing address book entry with the new phone number prior to updating the existing phone number in the associated pre-existing entry.

4. The method as in claim 1, wherein updating comprises:

supplementing said pre-existing address book entry with a new telephone number.

5. The method as in claim 1 wherein updating comprises:

replacing said pre-existing address book entry with a new telephone number without human intervention.

6. The method as in claim 4 wherein supplementing comprises:

classifying said new telephone number as a most recently used telephone number of said contact.

7. The method as in claim 4 wherein supplementing comprises:

classifying said new telephone number as an unknown type of number.

8. The method of claim 1, wherein the call is an incoming call.

9. The method of claim 1, wherein the call is an outgoing call.

* * * * *